(12) United States Patent
Mayrhofer et al.

(10) Patent No.: US 7,840,362 B2
(45) Date of Patent: Nov. 23, 2010

(54) METHOD AND APPARATUS FOR ASSESSING THE RESIDUAL LIFE OF A SENSOR UNIT

(75) Inventors: Norbert Mayrhofer, Graz (AT);
Klaus-Christoph Harms, Graz (AT);
Martin Rzehorska, Peggau (AT);
Rüdiger Teichmann, Hart b. Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 12/314,440

(22) Filed: Dec. 10, 2008

(65) Prior Publication Data
US 2009/0164166 A1 Jun. 25, 2009

(30) Foreign Application Priority Data
Dec. 19, 2007 (AT) .............................. GM753/2007

(51) Int. Cl.
*G06F 19/00* (2006.01)
*G01N 19/08* (2006.01)
(52) U.S. Cl. ........................ 702/34; 702/182; 73/799
(58) Field of Classification Search ................... 702/34, 702/35, 116, 182; 73/760, 779, 799
See application file for complete search history.

(56) References Cited

U.S. PATENT DOCUMENTS

| 6,434,512 B1 * | 8/2002 | Discenzo ................... 702/184 |
| 7,487,066 B2 * | 2/2009 | Sundermeyer et al. ...... 702/182 |
| 2006/0243055 A1 * | 11/2006 | Sundermeyer et al. ........ 73/760 |

FOREIGN PATENT DOCUMENTS

DE 10209318 9/2003

OTHER PUBLICATIONS

English Abstract of DE10209318.

* cited by examiner

*Primary Examiner*—Bryan Bui
(74) *Attorney, Agent, or Firm*—Dykema Gossett PLC

(57) ABSTRACT

The life of a sensor unit is very strongly dependent on the loading of the sensor unit during use. The life of a sensor unit is generally specified in a number of loading cycles, however, which does not take into consideration the loading of the sensor unit. The invention therefore specifies a method and apparatus for assessing the residual life of a sensor unit which takes into consideration the actual loading of the sensor unit and therefore the residual life of the sensor unit can be estimated more precisely by virtue of a damage factor (S) being determined for the loading of a loading cycle (B) and the loading cycle (B) being weighted therewith.

16 Claims, 3 Drawing Sheets

METHOD AND APPARATUS FOR ASSESSING THE RESIDUAL LIFE OF A SENSOR UNIT

BACKGROUND OF THE INVENTION

1. Field of the Invention

The invention relates to a method and an apparatus for assessing the residual life of a sensor which is fitted on a cyclically operating machine and is intended for a certain number of loading cycles, the loading cycles of the sensor being counted, and to the application of an apparatus according to the invention on an internal combustion engine.

2. The Prior Art

Sensors are often fitted on a cyclically operating machine, such as an internal combustion engine or an injection-moulding machine, for example, in order to continuously detect certain measured variables of the machine. Such sensors are subject to natural wear and therefore have a certain life. The life is in this case generally given in a specified permissible number of loading cycles. In this case, a loading cycle is a working cycle, for example a combustion cycle in an internal combustion engine or a casting operation in an injection-moulding machine, which occurs repeatedly. The sensors therefore need to be replaced regularly before they fail or produce results with an insufficiently high quality or accuracy. Until now, the sensors are either replaced after a fixed operating period or the individual loading cycles are simply counted and the sensor is replaced before the specified life has elapsed.

In practice, the life is strongly dependent on the loading of the sensor which actually occurs, however. If the sensor is primarily operated with low loads, the life can be extended. Conversely, the life of the sensor can also be considerably shortened if it is operated to an increased extent on high loads or if it is fitted incorrectly. The sensor can also have loading ranges in which it is subject to more severe damage than in other loading ranges. Life prognoses which are only geared to the number of loading cycles are therefore unreliable. Under certain circumstances, a sensor is replaced which would still have a considerable residual life or would still be suitable for another use, or a sensor fails prematurely.

An object of the invention is therefore to specify a method and an apparatus with which it is possible to assess the residual life of a sensor more precisely but nevertheless easily.

SUMMARY OF THE INVENTION

This object is achieved for the method and the apparatus by virtue of the fact that the loading of the sensor by the machine in a loading cycle is detected, a damage factor for the sensor unit is determined as a function of the detected loading by means of a damage model of the sensor unit for the loading cycle, and, in order to assess the residual life, the counted loading cycles are weighted with the respectively determined damage factor. With the method according to the invention, the actual damage to the sensor as a result of the actually occurring loading of the sensor is taken into consideration, as result of which the residual life can be determined more reliably. The actual life of the sensor can thus be utilized in optimum fashion. Owing to the damage model, the loading can also be taken into consideration in a flexible manner which is dependent on the application. In addition, the invention makes it possible to match the calibration intervals or the use of the sensor to the actual damage.

A very particularly advantageous configuration of the invention results if the determination of the damage factor is only carried out using the measured variable detected by the sensor unit since in this case no further measured variables are required and the method or the associated apparatus can be substantially simplified.

Particularly simple assessment of the residual life can be achieved if the weighted loading cycles are subtracted from the specified loading cycle number. Alternatively, the residual life can advantageously also be given in the form of a standardized value.

Particularly advantageously, the sensor unit can be categorized into permissible use types using the determined residual life. Now and again different applications require sensor units of different quality. For example, an already damaged sensor unit may be unsuitable for one application, but still sufficient for another. By means of such categorization, the available life and usability of the sensor unit can be further extended.

It is likewise very advantageous to determine the calibration intervals of the sensor unit using the determined residual life since already damaged sensor units with relatively short calibration intervals could nevertheless still be used to an unrestricted extent.

The subject matter of the invention will be explained in more detail with reference to the schematic, non-restrictive FIGS. 1 to 3, which show advantageous exemplary embodiments of the invention.

DETAILED DESCRIPTIOIN OF THE PREFERRED EMBODIMENTS

Figure 1:
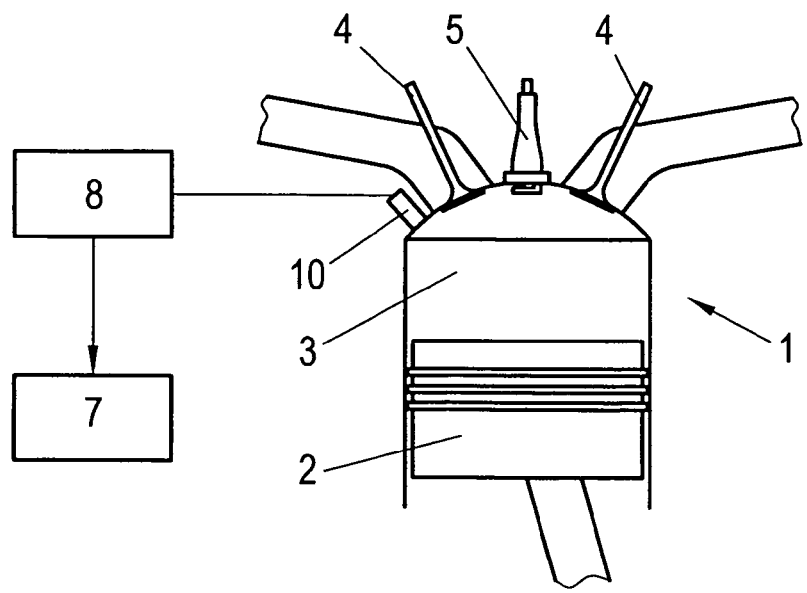
FIG. 1 shows a detail of a cylinder of an internal combustion engine.

FIG. 1 shows a detail of a cylinder 1 of an internal combustion engine. A piston 2 is moved in the cylinder cavity 3, and, in a known manner, valves 4 and, for the case of an Otto-cycle engine, a spark plug 5 are arranged on the cylinder 1, it naturally also being possible for the invention to be used in internal combustion engines with other combustion methods (for example diesel engine) and for both 2-stroke and 4-stroke engines. In addition, an indicating arrangement comprising a sensor unit 10, for example a piezoelectric pressure sensor, and an evaluation unit 8, for example an amplifier, is arranged on the cylinder 1, which indicating arrangement in this case measures and evaluates the cylinder pressure. However, the sensor unit 10 can also be, for example, a strain gauge, a piezoresistive pressure pickup, a structure-borne noise knock sensor, a sensor for sound and ultrasound emission analysis, an ion current probe, a flame light sensor, a sensor for needle excursion, valve excursion or piston excursion, etc. In a known manner, an indicating arrangement is generally understood to mean an arrangement which measures and/or evaluates measured motor variables, in particular, but not exclusively, regarding the combustion, during operation, for example during a working cycle, with a specific resolution for the dependence on time or crank angle. The indicating arrangement or the evaluation unit 8 of the indicating arrangement can, as in this example, be connected to a control device 7, such as, for example, a motor control device of a motor controller or to another processing unit, such as a test stand controller of a test stand, for example.

The invention can also be applied in other cyclically operating machines, such as in an injection-moulding machine, for example. In this case, the control device 7 could be, for example, the control device of the injection-moulding machine.

An assessment unit 6 is provided for assessing the residual life of the sensor unit 10. The assessment unit 6 can either be arranged directly in the sensor unit 10, as illustrated in FIG. 2a, in the evaluation unit 8, as illustrated in FIG. 2b, or else in the superordinate control device 7, as illustrated in FIG. 2c. The assessment unit 6 can be in the form of a microprocessor, signal processor or else in the form of a simple logic or electrical circuit.

Furthermore, a computation unit 12, such as a microprocessor or a DSP (Digital Signal Processor), for example, can be arranged in the evaluation unit 8, by means of which computation unit 12 the measured variable, in this case the cylinder pressure $p_{cyl}$ in the cylinder 1, for example, is further-processed as desired. The analogue-to-digital conversion of the measurement signal which may be required for this purpose can in this case take place directly in the computation unit 12 or else upstream thereof. The signal processed by the computation unit 12 of the evaluation unit 8 is output at an output in analogue or digital form and passed on, for example, to the control unit 7. In a simple embodiment, the assessment unit 6 and the computation unit 12 can naturally also be in the form of a single unit.

Likewise, a display device 15, such as a simple LCD display or a warning light, for example, can be arranged on the sensor unit 10 or the evaluation unit 8, which display device 15 can be used to display the residual life of the sensor unit 10.

In a known manner, a signal amplifier, in particular a charge amplifier 11 for a piezoelectric sensor, can also be arranged between the sensor unit 10 and the computation unit 12 or assessment unit 6, as illustrated in FIG. 2b. In addition, filter units and/or signal conditioning devices (also not illustrated here) can be provided in the evaluation unit 8 or between the sensor unit 10 and the evaluation unit 8.

Figure 2:
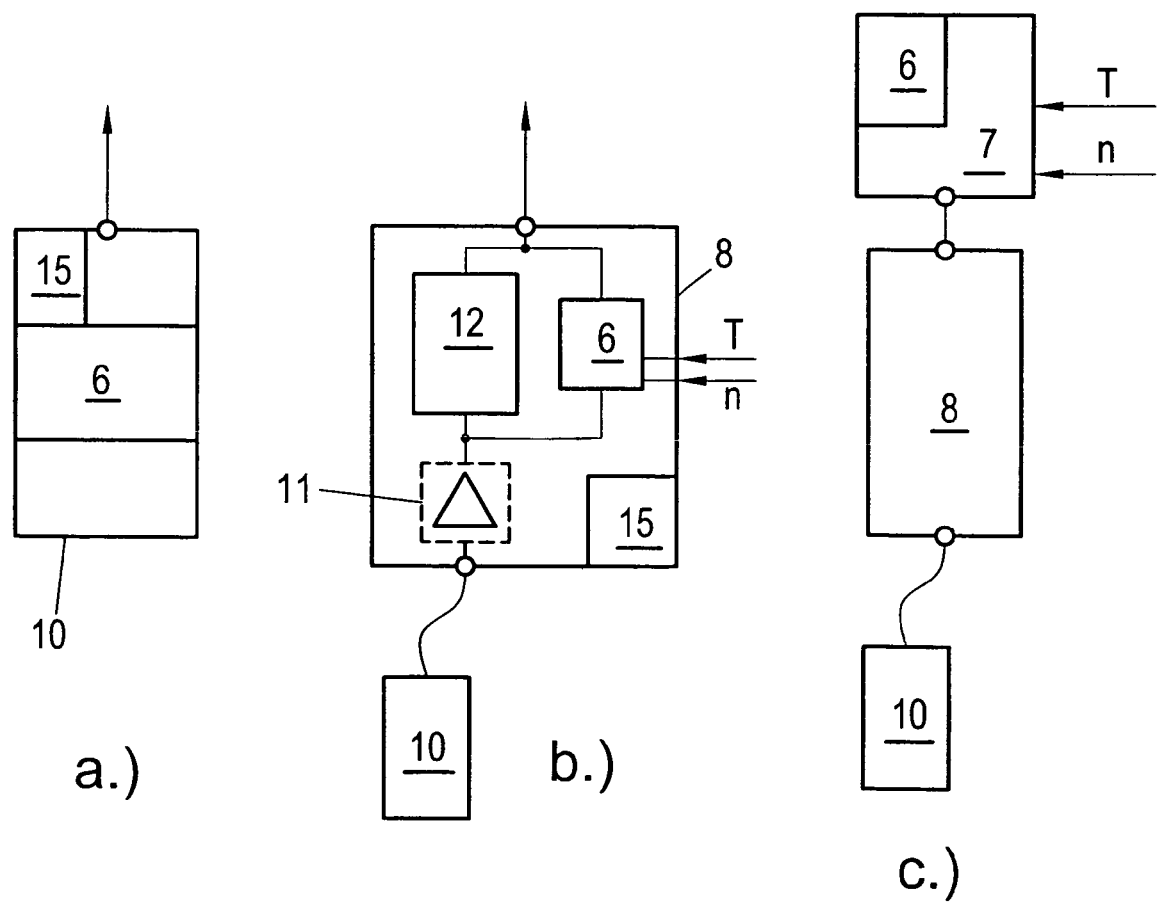
FIG. 2 shows schematic illustrations of an apparatus for assessing the residual life.

In order to be able to determine the residual life of the sensor unit 10, the loading of the sensor unit 10 in a loading cycle $B_k$ is determined in the assessment unit 6. This may be at one or more specific discrete point(s) of the loading cycle, for example the rotation speed n and the torque T in the event of the occurrence of the peak pressure $p_{max}$ during combustion in the cylinder 1, or it may also be that the loading process during all or part of the loading cycle, i.e., the entire combustion process or the entire working cycle, are recorded and evaluated. For this purpose, further measured variables, such as rotation speed n, torque T or temperature t of the internal combustion engine, for example, may also be required. These measured variables can be supplied to the assessment unit 6 externally, as is indicated in FIG. 2, or these variables may under certain circumstances also be determined directly from the measured variable itself in the assessment unit 6 or the computation unit 12.

Figure 3:
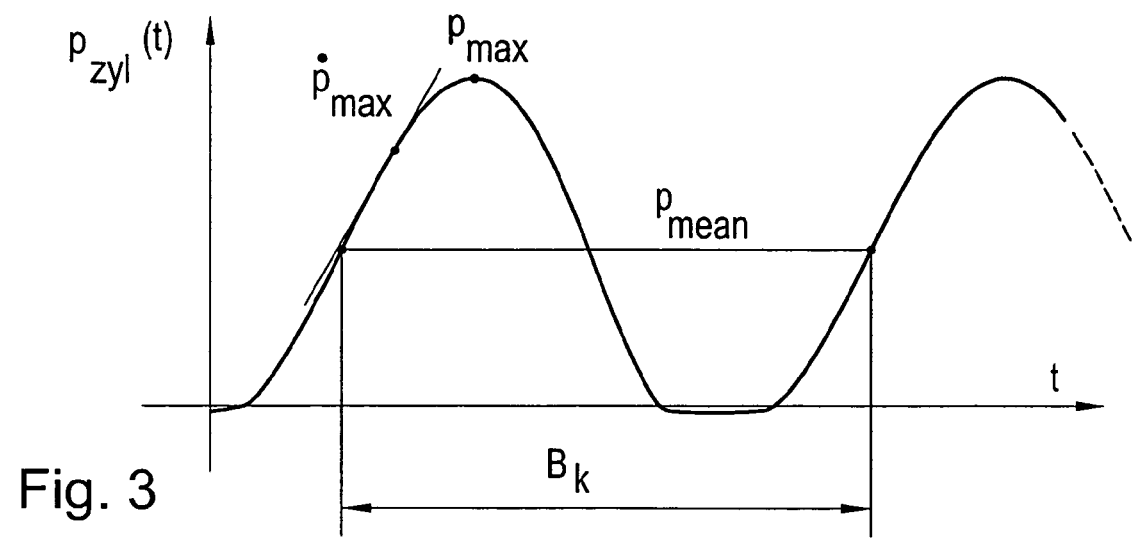
FIG. 3 shows a schematic illustration of a detected measured variable.

Particularly advantageously, the assessment of the residual life is only carried out using the measured variable detected by the sensor unit 10, for example the cylinder pressure $p_{cyl}$. In this case, the measured variable can be evaluated or further-processed in the evaluation unit 8, or in the computation unit 12 or assessment unit 6, also corresponding to the requirements. FIG. 3 illustrates, for example, a typical simplified profile of the cylinder pressure $p_{cyl}$, which is detected, for example, by a cylinder pressure pickup of an indicating arrangement. A series of characteristic variables can be derived from the time profile which can be used as a measure of the loading of the sensor unit 10 in a loading cycle $B_k$. In this case, the peak pressure $p_{max}$, the maximum pressure rise $\dot{p}_{max}$ or the mean cylinder pressure $p_{mean}$ are examples of the cylinder pressure.

Figure 4:
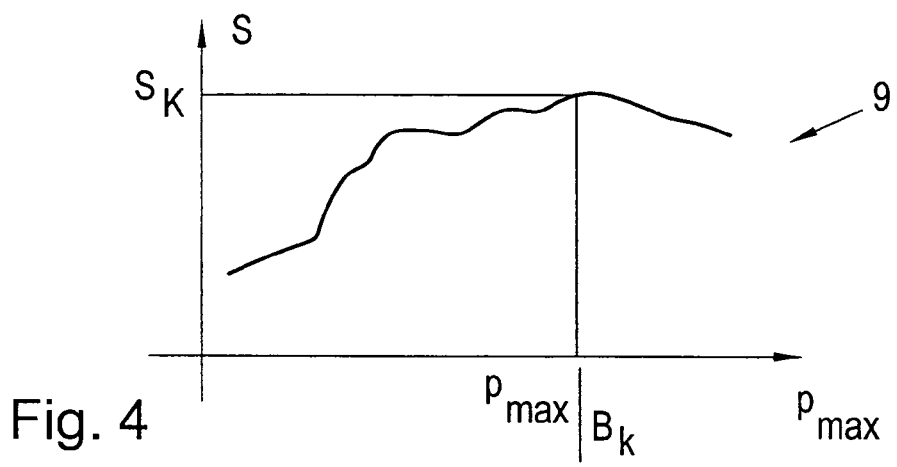
FIGS. 4 and 5 show schematic illustrations in each case of a damage model for the sensor unit.

It is of course also possible for other characteristic variables which are known in principle to be derived. Furthermore, the loading cycles $B_k$ could also be determined directly from the time profile. A loading cycle $B_k$ is characterized by recurring similar loads, for example a combustion cycle, which can consequently be identified from an analysis of the time profile of the measured variable. The evaluation of a measured variable in the above-described sense is described, for example, in the Austrian utility model AT 009 242 U. The loading state of the loading cycle $B_k$ is then supplied to a damage model 9, as indicated in FIG. 4, for example. The damage model 9 can in this case be implemented in the assessment unit 6, the evaluation unit 8 or the control unit 7. A possible damage model 9 is in principle any physical, mathematical or empirical model as a function of specific parameters for example in the form of a formulaic relationship, a numerical calculation or in the form of a stored table or curve or area. Likewise, a simulation is conceivable as the damage model 9. The precise implementation of the damage model 9 is immaterial to the invention, however, and will only be explained by way of example below.

In the exemplary embodiment shown in FIG. 4, the cylinder pressure $p_{cyl}$ is detected using measurement technology and is evaluated as described above as regards a specific characteristic variable, for example the maximum cylinder pressure $p_{max}$ is determined. This characteristic variable is used to determine a damage factor $S_k$ for the loading cycle $B_k$ using the damage model 9. In this example, the damage model 9 is stored in the evaluation unit 8 in the form of a damage curve, for example obtained from calculations, simulations or from empirical data, in a suitable manner, for example as a stored table or as a formulaic relationship $S_k=f(p_{max})$. The damage factor $S_k$ can of course also be determined using a plurality of characteristic variables derived from the measured variable, for example maximum cylinder pressure $p_{max}$ and mean cylinder pressure $p_{mean}$, since the damage to the sensor unit 10 can be defined by a series of influencing variables.

The loading cycle $B_k$ is now weighted with this determined damage factor $S_k$, with the result that this loading cycle $B_k$ reduces the residual life R of the sensor unit 10 to a greater or lesser extent. If the specified life of the sensor unit 10 in loading cycles (for example $10^8$ loading cycles) is denoted by L, the residual life R in loading cycles can be calculated for example in the form $$R = L - \sum_k S_k.$$

Alternatively, a standardized residual life of the form $$R = \frac{\sum_k S_k}{L}$$

could also be calculated. The residual life is then a value of between 0 and 1, where 0 can represent undamaged and 1 can represent destroyed. In this case, the damage to the sensor has progressed to a greater extent the nearer R is to the number 1.

However, other measured variables can also be used for determining a damage factor $S_k$. In the example shown in FIG. 5, the cylinder pressure $p_{cyl}$, for example, is measured in a loading cycle $B_k$ with the sensor unit 10. The rotation speed n and the torque T of the internal combustion engine are detected at the same time as this and likewise supplied to the assessment unit 6. For example, along with the peak pressure $p_{max}$, the rotation speed $n_k$ and the torque $T_k$ are determined. These variables $n_k(p_{max})$ and $T_k(p_{max})$ implicitly contain further parameters, such as, for example, the current temperature, which is dependent on the load point, and these parameters are therefore likewise included in the damage model. In an associated damage model 9, in this example using the rotation speed n and the torque T, the damage factor S is stretched out in the form of a damage curve, for example obtained from calculations, simulations or from empirical data. In this case, there could even be different damage models 9 for different peak pressures. The damage model 9, can, however, naturally also be stored mathematically, for example as a formulaic relationship $S=f(p_{max}, T, n)$, as a function of the parameters. A damage factor $S_k$ is now determined by the values $n_k$ and $T_k$. The loading cycle $B_k$ is now again weighted with this damage factor $S_k$, with the result that this loading cycle $B_k$ reduces the residual life R of the sensor unit 10 to a greater or lesser extent. If the specified life of the sensor unit 10 in loading cycles (for example $10^8$ loading cycles) is denoted by L, the residual life R in loading cycles can be calculated, for example, in the form $$R = L - \sum_k S_k.$$

Alternatively, a standardized residual life of the form $$R = \frac{\sum_k S_k}{L}$$

could also be calculated. The residual life is then a value of between 0 and 1, where 0 can represent undamaged and 1 can represent destroyed. In this case, the damage to the sensor has progressed to a greater extent the nearer R is to the number 1.

However, it is also conceivable to recalculate the residual life R only after a certain number of loading cycles $B_k$ or after a certain time in order to reduce the computation loading.

The damage model 9 can also have other input parameters, however, such as the mean cylinder pressure $p_{mean}$ (indicated mean effective pressure) and the rotation speed n or the mean cylinder pressure $p_{mean}$ and the current sensor temperature, for example. In this case, a damage curve or area could be stretched via these parameters. Likewise, the damage model 9 can also be dependent on more than two parameters, with the result that the damage factor can generally be represented as $S=f(P_1, \ldots, P_n)$, where P is any desired parameter, such as the rotation speed n, the torque T, the sensor temperature t, the mean cylinder pressure $p_{mean}$, the peak pressure $p_{max}$, etc.

In the above-described method, each loading cycle $B_k$ is therefore evaluated individually and immediately and supplied to the residual life calculation step. However, the frequency H (in loading cycles) of the occurrence of specific loading states can also be determined and a damage and the residual life of the sensor unit 10 calculated therefrom.

Figure 7:
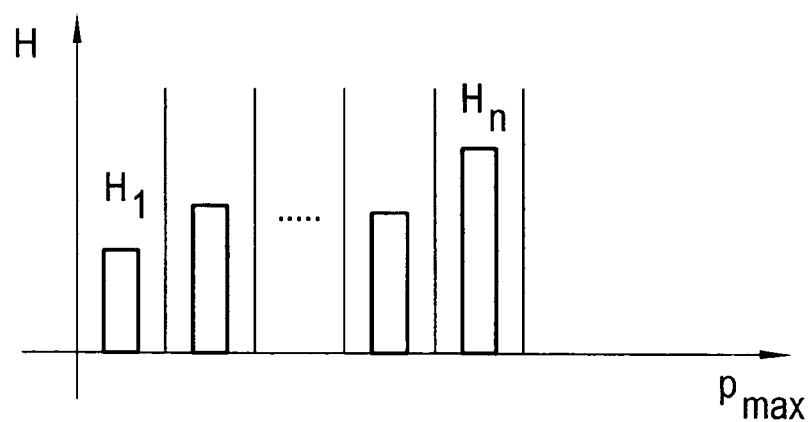
FIGS. 6 and 7 show schematic illustrations in each case of a frequency histogram.
Figure 5:
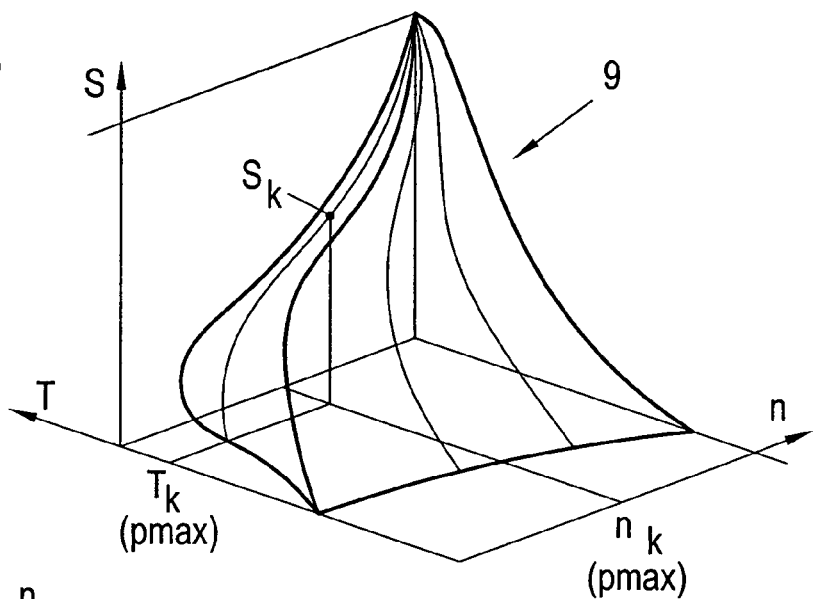
Figure 6:
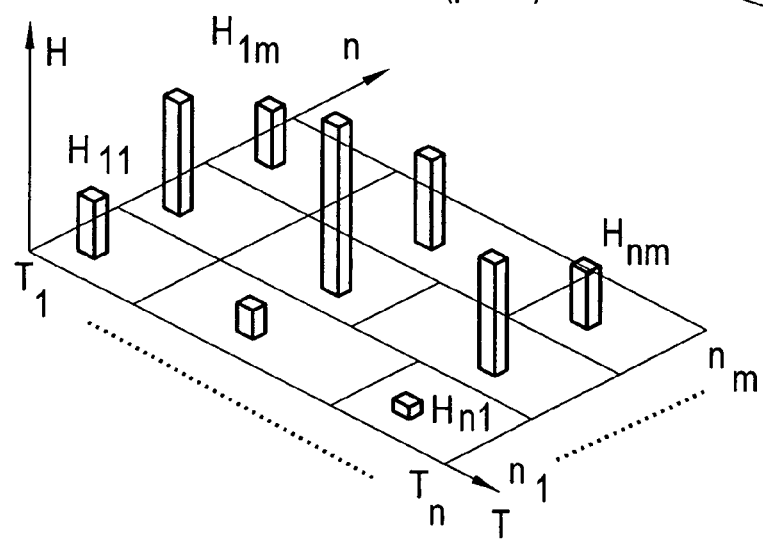

In FIG. 6, for example, the torque/rotation speed area (or, for example, also a $p_{max}/\dot{p}_{max}$ area) of the internal combustion engine is split into specific loading subareas. If only the measured variable which is detected by the sensor unit 10 is used for the evaluation and a characteristic variable is derived therefrom, the frequency H of the occurrence of specific characteristic variable areas can be used, as illustrated in FIG. 7, for example. The frequency H of the occurrence of the fixed loading states, for example torque $T_n$ given a rotation speed $n_m$ at $p_{max}$ or only $p_{max}$, is now counted for a specific period, for example number of loading cycles $B_k$ or a certain time. This detection results in a frequency histogram, for example, as illustrated in FIG. 6 or 7. These determined frequencies $H_{nm}$ and $H_n$ can now be weighted with an associated damage factor S. For this purpose, a damage model 9, for example as illustrated in FIG. 4 or 5, can be used. The damage model 9 is in this case advantageously likewise split into the loading subareas of interest. As an alternative to this, a corresponding mean value from the damage model 9 could also be used for a loading subarea. This can be used, in turn, to calculate a residual life R, for example in the form $$R = L - \sum_n \sum_m H_{nm} S_{nm} \text{ or } R = L - \sum_n H_n S_n.$$

The residual life R can in this case naturally also in turn be determined as a standardized variable. In this case, L can again be the specified life or the determined residual life of the preceding calculation. Alternatively, the frequencies of the loading states could also be counted continuously and the calculation of the residual life only carried out at certain intervals.

The residual life R can now be output, for example, directly on a display device 15 on the sensor unit 10 or the evaluation unit 8 or is processed correspondingly in a superordinate unit, for example the control unit 7 or a test stand software or a sensor management unit. If the sensor unit 10 reaches a certain degree of damage in the form of a defined residual life R, it can be replaced, for example.

However, the sensor unit 10 could also be categorized in terms of its usability as a function of the residual life R, for example in the form of the table below.

| Residual life R in loading cycles | | | | |
|---|---|---|---|---|
| >50 mill. | >20 mill. | ... | >5 mill. | >1 mill. |
| Use 1 | Use 2 | ... | Use n − 1 | Use n |

The sensor unit 10 may no longer be suitable for a specific use once a certain residual life R is reached, but very suitable for another use, for example a less demanding use. For example, a pressure sensor may already be unsuitable for thermodynamic investigations in which a high degree of accuracy is required, but may still be used for motor applications, for example.

Likewise, a calibration interval for a sensor unit 10 can be matched to the current damage or residual life R. For example, the calibration interval can be shortened the shorter the residual life R is.

It is likewise conceivable for the damage module 9 to be adaptively matched during operation. As a result of the operation of the sensor unit 10 or as a result of continuous investigations on removed or used sensor units 10, many empirical values are obtained which can subsequently be used in the damage model 9 in order to make the damage model 9 more accurate and to match it and in order to maximize the usability of the sensor unit 10. This process can also take place in automated fashion.

Figure 8:
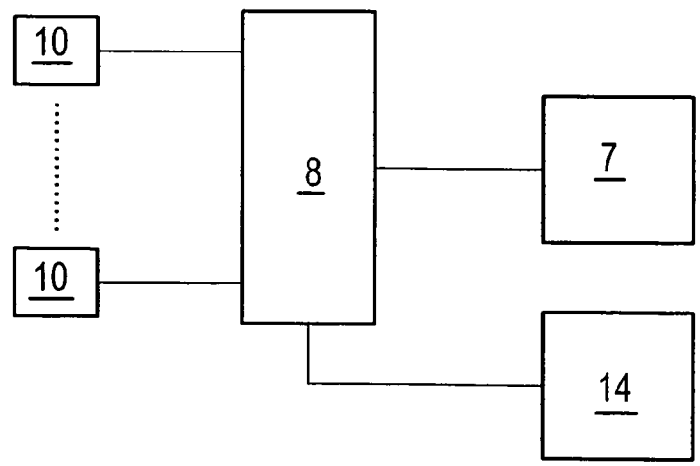
FIG. 8 shows an arrangement with a sensor management unit.

The sensor units 10 with the associated determined residual lives R can also be managed in a sensor management unit 14, as indicated in FIG. 8. When or at what intervals a sensor unit 10 is to be calibrated or tested, for example, can be stored in such a sensor management unit 14, which makes it possible for the actual damage to the sensor unit 10 to be taken into consideration during calibration or during self-testing, and it is also possible for the uses for which a sensor unit 10 with a certain degree of damage can still be used to also be stored. The sensor management unit 14 is, for example, a database, which manages the sensor units 10 and receives data from the individual sensor units 10 (or the evaluation unit 8, as in FIG. 8, or the control unit 7).

The invention claimed is:

1. A method for assessing the residual life (R) of a sensor unit, which is fitted on a cyclically operating machine and is intended for a certain number of loading cycles (B), comprising the steps of:
   detecting loading of the sensor unit by the machine in a loading cycle (B),
   determining a damage factor (S) for the sensor unit as a function of the detected loading by means of a damage model of the sensor unit for the loading cycle (B), and
   weighing the loading cycle (B) with the respectively determined damage factor (S) in order to assess the residual life (R).

2. The method according to claim 1, wherein only a measured variable detected by the sensor unit is used to determine the damage factor (S).

3. The method according to claim 1, wherein each loading cycle (B) is weighted individually and the residual life (R) is determined continuously.

4. The method according to claim 1, wherein each loading cycle (B) is weighted individually and the residual life (R) is determined after a certain number of loading cycles (B) or a specific time.

5. The method according to claim 1, wherein a frequency (H) of the occurrence of a specific loading state in loading cycles (B) is counted and the counted frequency (H) is weighted with the damage factor (S) determined for the loading cycle (B) in order to determine the residual life (R).

6. The method according to claim 5, wherein the weighted loading cycles (B) or a weighted frequency (H) of the loading cycles (B) is subtracted from a specified loading cycle number (L).

7. The method according to claim 5, wherein the weighted loading cycles (B) or the weighted frequency (H) of the loading cycles (B) is standardized with a predetermined value, preferably the specified number (L) of permissible loading cycles.

8. The method according to claim 1, wherein the sensor unit (10) is categorized into permissible use types using the determined residual life (R).

9. The method according to claim 1, wherein a calibration interval or a self-testing interval of the sensor unit (10) is determined using the determined residual life (R).

10. An apparatus for assessing the residual life (R) of a sensor unit comprising: a sensor unit which is fitted on a cyclically operating machine and intended for a certain number of loading cycles (B), and an assessment unit to determine a damage factor (S) as a function of the loading of the sensor unit for a loading cycle (B) using a damage model, and to weigh the loading cycle (B) with the determined damage factor (S) in order to assess the residual life (R).

11. The apparatus according to claim 10, wherein the assessment unit is in the sensor unit.

12. The apparatus according to claim 10, wherein the assessment unit is in an evaluation unit, which is connected to the sensor unit.

13. The apparatus according to claim 10, wherein the assessment unit is in a control unit, which is connected to the evaluation unit, which is connected to the sensor unit.

14. The apparatus according to claim 10, including an output device for outputting the residual life (R) of the sensor unit on the sensor unit, on the evaluation unit or on the control unit.

15. The apparatus according to claim 10, including a sensor management unit in which the sensor unit together with the associated determined residual life (R) is managed.

16. An internal combustion engine with a sensor unit for detecting a measured motor variable and with an apparatus for assessing the residual life (R) of the sensor unit according to claim 10.

* * * * *